Nov. 6, 1923. Re. 15,714

M. F. CARR

SEPARABLE FASTENER

Original Filed March 8, 1921

Inventor:
Moses F. Carr,
by Emery Booth Vanney & Vanney
Attys.

Reissued Nov. 6, 1923. Re. 15,714

UNITED STATES PATENT OFFICE.

MOSES F. CARR, OF LEXINGTON, MASSACHUSETTS, ASSIGNOR TO CARR FASTENER COMPANY, OF CAMBRIDGE, MASSACHUSETTS, A CORPORATION OF MAINE.

SEPARABLE FASTENER.

Original No. 1,433,785, dated October 31, 1922, Serial No. 450,753, filed March 8, 1921. Application for reissue filed July 28, 1923. Serial No. 654,498.

*To all whom it may concern:*

Be it known that I, MOSES F. CARR, a citizen of the United States, formerly residing at Newton, in the county of Middlesex, State of Massachusetts, and now a resident of Lexington, in the county of Middlesex, State of Massachusetts, have invented an Improvement in Separable Fasteners, of which the following description, in connection with the accompanying drawings, is a specification, like characters on the drawings representing like parts.

This invention pertains to improvements in separable fasteners. It is among the objects of the invention to provide a separable fastener of the "three-side lock" type wherein stud and socket are separable by relative tipping movement in a predetermined direction only, and in which the number of parts will be reduced to a minimum and the construction simplified.

In the drawings, which show a preferred form of my invention selected for illustrative purposes:—

Figure 1:
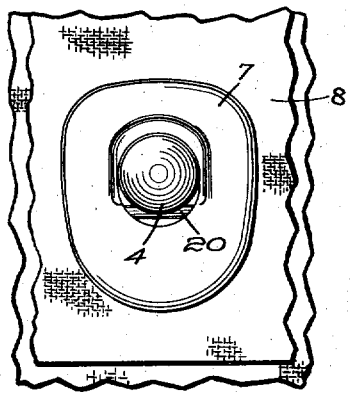
Figure 1 is a front elevation of the fastener secured to its carrying fabric.
Figure 2:
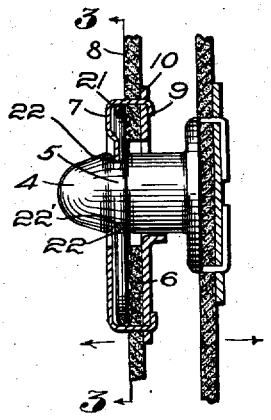
Fig. 2 is a section on the line 2—2 of Fig. 1, being partly in elevation.
Figure 3:
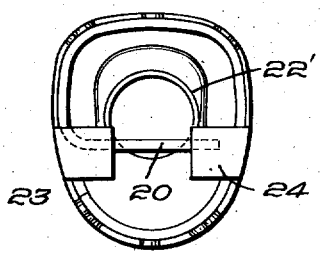
Fig. 3 is a section on the line 3—3 of Fig. 2, being partly in elevation.
Figure 4:
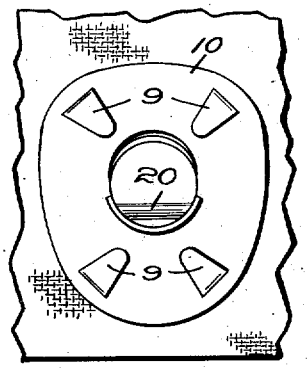
Fig. 4 is a rear elevation of the socket.

Referring to the drawings and to the preferred form of my invention selected for illustrative purposes. I have shown a fastener including a stud having a head 4, a neck 5, a shank portion 6, the shoulder between the head 4 and neck 5 sloping somewhat. I have shown a socket including a casing 7 secured to the socket-carrying fabric 8 by prongs 9 penetrating said fabric and clinched over a back plate 10 on the opposite side of the fabric from the socket casing. The back plate 10 is provided with a stud-receiving aperture elongated to permit relative tipping movement of stud and socket in the directions indicated by the arrows in Fig. 2. In the casing 7 I have shown a transverse stud-engaging jaw 20, which may be and preferably is, as shown, a part of the spring 21. The socket casing 7 provides above the stud opposite the yielding jaw 20 a fixed or rigid jaw 22. The spring is held in the casing and the yielding jaw is guided by projections bent over from the marginal portions of the socket casing, such projections being preferably of the general character indicated at 23, 24, so as to permit relatively free guided movement of the yielding jaw 20. When the stud is entered in the socket, the rounded head of the stud pushes the spring 20 out of its path and causes the stud to be depressed sufficiently to permit its head to pass the solid jaw 22, the yielding jaw 20 then pressing the stud upwardly so that the neck of the stud engages the solid jaw 22, thus holding the parts in engagement. The inclination of the shoulder between the head of the stud and its neck is preferably such that no ordinary strain would produce such a resolution of forces as to permit the stud to be separated from the socket. Relative tipping movement of stud and socket in three directions is prevented by the sides and bottom of the elongated aperture in the back plate 9 while such relative tipping movement in the fourth direction is permitted by reason of the elongation of the aperture in the back plate above the stud. The projection 22′ provides a relatively large bearing surface of the fixed jaw 22 against the neck of the stud and terminates in a proper position to act as a stop precluding excessive upward movement of the yielding jaw.

While I have shown and described a preferred form of one embodiment of my invention, it will be understood that major changes involving omission, substitution, alteration and reversal of parts, and even changes in the mode of operation, may be made without departing from the scope of my invention, which is best defined in the following claims.

Claims:

1. A separable fastener comprising, in combination, a stud having a head and a neck presenting a shoulder between them, and a socket having a spring-containing casing, said casing apertured to permit passage of the head of the stud therethrough and presenting above the stud an unyielding neck-engaging jaw, a resilient jaw opposing said unyielding jaw, said yielding jaw formed by a terminal portion of said spring, and spring-retaining portions 24 thrown inwardly from the periphery of said casing to support said yielding jaw.

2. A separable fastener comprising, in combination, a stud having a head and a neck presenting a shoulder between them, and a socket having a spring-containing casing, said casing apertured to permit passage of the head of the stud therethrough and presenting above the stud an unyielding neck-engaging jaw, a resilient jaw opposing said unyielding jaw, said yielding jaw formed by a terminal portion of said spring and spring-retaining portions 24 thrown inwardly from the periphery of said casing to support said yielding jaw, prongs projecting from said casing through the socket-carrying fabric and a back plate having an opening relatively closely fitting the stud on three sides thereof, said opening extended to provide a clearance on the fourth side, the side opposite said yielding jaw.

3. A three-side lock fastener comprising, in combination, a stud having a head and a neck, a socket including a casing, a spring in said casing providing a stud-engaging jaw extending transversely of said socket, jaw-supporting and spring-retaining projections 24 integral with said socket and overlying said spring, a back plate located on the opposite side of the socket-carrying fabric from said casing, and means for holding said casing and back plate in assembled relationship with the socket-carrying fabric gripped directly between them.

4. A socket for three-side lock fasteners including three pieces,—a casing, a spring and a back plate, said casing providing an unyielding jaw for engagement with the stud, said spring providing a yielding jaw for engagement with the stud and said back plate located on the opposite side of the socket-carrying fabric from said casing and spring while providing a stud-receiving aperture the sides of which limit tipping movement of the stud relative to the socket in three directions, but provide a clearance permitting such tipping action in a fourth direction.

5. A socket for three-side lock fasteners including a spring, a casing, and a back plate, said spring providing yielding jaw means for engagement with a co-operating stud, said casing containing said spring and providing an integral projection inwardly from the back edge of said casing to guide and support said yielding jaw means, and said back plate adapted to be located on the opposite side of the socket carrying fabric from said casing and spring while providing a stud receiving aperture the sides of which limit tipping movement of the socket relative to the stud in three directions but provide a clearance to permit such tipping movement in a fourth direction, with attendant release of the socket from the stud.

6. A socket for three-side lock fasteners including three pieces—a casing, a spring presenting resilient jaw means and a back plate said casing containing said spring and presenting an integral projection guiding and supporting said resilient jaw means and said back plate located on the opposite side of the socket carrying fabric from said casing and spring, while providing a stud receiving aperture the sides of which limit tipping movement of the stud in the socket in three directions while providing a clearance permitting substantial tipping movement in a fourth direction.

MOSES F. CARR.